United States Patent
Wilson

(10) Patent No.: US 6,201,816 B1
(45) Date of Patent: Mar. 13, 2001

(54) TOKEN RING SPEED DETECTION

(75) Inventor: David William Wilson, Buckinghamshire (GB)

(73) Assignee: Madge Networks Limited, Buckinghamshire (GB)

( * ) Notice: Subject to any disclaimer, the term of this patent is extended or adjusted under 35 U.S.C. 154(b) by 0 days.

(21) Appl. No.: 08/852,284

(22) Filed: May 7, 1997

(30) Foreign Application Priority Data

May 9, 1996 (GB) .................................................. 9609688

(51) Int. Cl.[7] .................................................. H04L 12/42
(52) U.S. Cl. .................................................. 370/452; 370/252
(58) Field of Search .................................................. 370/252, 254, 370/258, 452, 453, 454, 459, 460, 461, 434, 222, 223, 241, 908, 909; 340/825.05; 395/200.81

(56) References Cited

U.S. PATENT DOCUMENTS

| | | | |
|---|---|---|---|
| 5,309,428 | * | 5/1994 | Copley et al. .................... 370/17 |
| 5,353,286 | * | 10/1994 | Patrick et al. .................... 370/85.15 |
| 5,365,513 | * | 11/1994 | Copley et al. .................... 370/17 |
| 5,384,779 | * | 1/1995 | Patrick et al. .................... 370/85.12 |
| 5,394,401 | * | 2/1995 | Patrick et al. .................... 370/85.1 |
| 5,425,017 | * | 6/1995 | Copley et al. .................... 370/13 |
| 5,442,629 | * | 8/1995 | Geyer et al. .................... 370/252 |
| 5,530,696 | * | 6/1996 | Boggs et al. .................... 370/252 |
| 5,537,098 | * | 7/1996 | Patrick et al. .................... 340/825.05 |
| 5,703,872 | * | 12/1997 | Boggs et al. .................... 370/252 |
| 5,999,541 | * | 12/1999 | Hinchey et al. .................... 370/466 |
| 6,026,096 | * | 2/2000 | Ferguson .................... 370/452 |
| 6,035,340 | * | 3/2000 | Fischer et al. .................... 709/249 |

OTHER PUBLICATIONS

"Real–Time Adapter Reconfiguration to Accommodate Different Network Speeds", *IBM Technical Disclosure Bulletin*, vol. 39, No. 5, May 1, 1996, pp. 267–268.

* cited by examiner

Primary Examiner—Ajit Patel
Assistant Examiner—Brian Nguyen
(74) Attorney, Agent, or Firm—Sughrue, Mion, Zinn, Macpeak & Seas, PLLC

(57) ABSTRACT

A method of inserting an end station (6–8) into a token ring network (2). The end station (6–8) attempts to open into the ring network in one insertion mode, the end station responding to an insertion error code relating to an insertion event, before the end station applies phantom drive, to change from one insertion mode to another insertion mode. A change of insertion mode is a change in at least one of end station speed and end station idling speed.

13 Claims, 4 Drawing Sheets

TOKEN RING SPEED DETECTION

FIELD OF THE INVENTION

The invention relates to token ring networks.

DESCRIPTION OF THE PRIOR ART

Conventional token ring networks include a hub or concentrator having a number of ports which can be connected to respective end stations such as PCs and the like. Each port is connected internally within the hub to a respective switching unit, the switching units being connected in a ring. Each switching unit is able either to pass signals out through a port to a connected end station and then to pass returning signals from the end station on to the next switching unit or to bypass the port. In a passive hub, the switching units are operated either manually or at a low intelligence level whereas in an active hub, the hub will include a controller which monitors performance of the ring and also the connection of end stations.

Typically, when a new end station is to be connected to the ring, it is first physically connected to a spare port of the hub and then the end station raises phantom which involves generating a DC signal on the line connected to the hub unit, typically at a 5V level, which indicates to the controller within the hub unit that the end station is present and wishes to be incorporated in the ring.

Token ring networks operate at speeds of either 4 Mbps or 16 Mbps. End stations which attempt to insert into a ring at the wrong speed can cause significant disruption. To avoid this type of disruption, manufacturers of token ring hubs have implemented various speed detection circuits to enable the token ring hub to lock end stations running at the wrong speed out of the ring. However, there are a number of different manufacturers of token ring hubs and since a method of performing speed detection does not form part of the IEEE Standard 802.5, several different methods have evolved.

As a method for performing this speed detection is not standardised, there are several different methods used in the marketplace:

1. Passive Hubs—As a result of the fact that these hubs are passive, they do not contain a speed detect mechanism.
2. Active Retiming Concentrators (ARCs)—These hubs actively retime all data passing through their ports to the ring speed at which they are configured.
3. Active Hub (Idles)—These hubs detect the speed of the inserting end station based on the speed of data on the lobe immediately after the end station raises phantom.
4. Active Hub (Lobe Test)—These hubs detect the speed of an end station's lobe test before they raise phantom and attempt to join the ring.
5. Active Hub (Burst Errors)—These hubs make use of an architecturally defined response from the end station to detect ring speed. Upon the end station raising phantom, they fix their output signal at one level, thus simulating a Burst Error. This causes an 802.5 compliant end station to apply burst error correction to the incoming signal, which involves adding transitions to the incoming signal at the appropriate data rate. This burst error corrected signal is then used to determine the speed of the attaching end station.

From the point of view of an end station attempting to detect the correct speed to operate at, these different styles of hubs present a challenge which to date has not been successively solved. There are a number of partial solutions to the end station ring speed detect problem, but none of them successfully insert into all the types of hubs outlined above.

In an attempt to reduce the configuration burden placed on the end user, token ring adaptor cards coupled to the end stations to provide an interface with the ring have been designed to sense automatically the speed of the network and configure themselves accordingly.

For an inserting end station attempting to detect the correct speed to operate at in a token ring network, these different token ring hubs present a challenge. If the end station does not insert at the correct speed it will be locked out of the token ring network by the token ring hub.

In one attempt to overcome this problem, the token ring adaptor card is provided with hardware to detect starting delimiters in token ring frames from upstream end stations in the ring once the end station has applied phantom drive or raised phantom. If a starting delimiter is detected and it is at the same speed as that with which the adaptor card was initialised by the host, then the end station completes the IEEE Standard 802.5 insertion process. If a starting delimiter is detected at the other speed then an error code is returned to an adaptor card driver in the host or end station which re-initialises the adaptor card at the other speed and restarts the insertion process. In this technique, starting delimiters are detected by the adaptor card using a pair of phase lock loops (PLL), one of which attempts to lock to a 4 Mbps signal and the other to a 16 Mbps signal. A successful insertion speed is stored in flash memory and the end station uses this as the first speed to try on the next insertion of the end station to the ring.

This form of automatic speed detection adaptor card is unable to insert into a token ring correctly for all of the token ring hubs currently in commercial use. Whilst this approach always works with passive token ring hubs, some active token ring hubs take a decision during a standard lobe test or as the end station applies phantom drive as to whether or not to allow the end station to insert into the ring. In a standard lobe test, the MAC layer on the adaptor card actively monitors the connection with the hub unit. Some active hub units monitor the speed of idle data generated by the end station during a lobe test, when the end station is physically connected to a port but before it has even applied phantom drive. If this monitoring indicates that the speed of the idle data is incompatible with the speed of the token ring, the controller will not permit the end station to open into the ring upon detecting the phantom drive signal. If an end station is operating at the incorrect speed at this time, then it will normally end up being locked out of the token ring. The end station must then repeat the process in complete ignorance of the reason for the failure and consequently, may never be able to insert into the ring.

A further problem with existing adaptor cards is that the end stations are capable of transmitting token ring frames whilst performing the automatic speed detection operation. This means that if two or more automatic speed detection capable end stations attempt to join an empty ring at the same time, they can mislead each other into believing that the ring is configured at one speed by detecting starting delimiters in token ring frames transmitted from another automatic speed detecting end station. This could very easily be the wrong speed and thus prevent any fixed speed end stations which are configured to operate at the correct speed for the token ring network from joining the network subsequently.

SUMMARY OF THE INVENTION

According to a first aspect of the present invention, a method of inserting an end station into a token ring network in which the end station attempts to open into the ring network in one insertion mode, the end station responding to an insertion error code relating to an insertion event, before the end station applies phantom drive, to change from the one insertion mode to another insertion mode, wherein a change of insertion mode is a change in at least one of end station speed and end station idling speed.

In the present invention, the detection of an initial failure code relating to an insertion event (an insertion error code) before a end station raises phantom causes the end station to change insertion mode, where a change in insertion mode is a change in at least one of end station speed and end station idling speed. An example of an insertion error code is a Lobe Test failure code. This mode of failure can result when a end station configured for one speed attempts to open into a token ring network configured to operate at a different speed and is protected by an active token ring hub. As a result, the end station does not insert into the ring until it has been configured at the correct speed.

Preferably, at least three insertion modes are provided.

Preferably, in a first insertion mode, the end station is configured to run at a first speed and idle at the same speed; in a second insertion mode the end station is configured to run at the first speed and idle at a second speed; and, in a third insertion mode the end station is configured to run at the second speed and idle at the second speed.

Most preferably, the first speed is 16 Mbps and the second speed is 4 Mbps.

Most preferably, the method of the first aspect of the present invention is carried out within processing means in an adaptor card.

According to a second aspect of the present invention, we provide a method of inserting an end station into a token ring network, in which the end station remains passive after applying phantom drive and does not transmit token ring frames until starting delimiters in token ring frames from an upstream end station in the token ring are detected.

In this aspect of the present invention, after raising phantom, the end station remains passive and attempts to detect the speed of the network by sampling starting delimiters of token ring frames transmitted by an upstream end station in the token ring network. In this "passive" state, the end station does not transmit token ring frames, although it will of course pass received token ring frames to a downstream end station.

This aspect of the invention is particularly suitable for use with passive hub units enabling the end station to confirm that it has inserted onto the ring in the correct insertion mode.

Preferably, if, after a predetermined period, no starting delimiters of token ring frames are detected, the end station abandons the ring insertion procedure.

Preferably, if starting delimiters are detected in token ring frames at a different speed to the speed with which the end station is configured, the speed of the end station is changed to correspond to the speed detected.

According to a third aspect of the present invention, we provide a method of inserting an end station into a token ring network wherein when a change from one insertion mode to another results in a successful end station lobe test, the phantom drive is applied and the end station transmits token ring frames. This enables an end station to open as a single end station when connected to an ARC.

Most preferably, the methods of one or more of the first, second, and third aspects of the present invention are combined.

According to a fourth aspect of the present invention, an apparatus for performing speed detection of a token ring network when an end station attempts to open into the ring, comprises processing means for detecting insertion error codes relating to insertion failure events before the end station applies phantom drive and for affecting a change from one insertion mode to another insertion mode, where a change in insertion mode is a change in at least one of end station speed and end station idling speed, and thereby configure the end station to run at the same speed as the token ring network.

Preferably, the apparatus further comprises means for sampling a data signal on the ring after the end station has applied phantom drive to detect the speed of the data signal.

Preferably, the data sampling means comprises a phase lock loop, a first token ring frame starting delimiter detector configured to detect starting delimiters at a first speed and a second token ring frame starting delimiter detector configured to detect starting delimiters at a second speed.

Preferably, the processing means is programmed so that in the event that the speed of the network is not determined before the end station applies phantom drive, the processing means prevents the end station from transmitting token ring frames of its own until the data sampling means detects starting delimiters in tokens or token ring frames from an upstream end station.

Preferably, the processing means is programmed to operate in three or more insertion modes. A change from one insertion mode to another insertion mode results in a change in one or both of end station ring speed and end station idling speed.

Preferably, in at least one of the insertion modes, the processing means is programmed so that the end station runs at one of a first speed and second speed and idles at the other of the first speed and second speed, respectively.

Preferably, the speed detection apparatus is arranged in an adaptor card.

BRIEF DESCRIPTION OF THE DRAWINGS

An example of the present invention will now be described with reference to the accompanying drawings, in which.

DETAILED DESCRIPTION OF THE EMBODIMENTS

Figure 1:
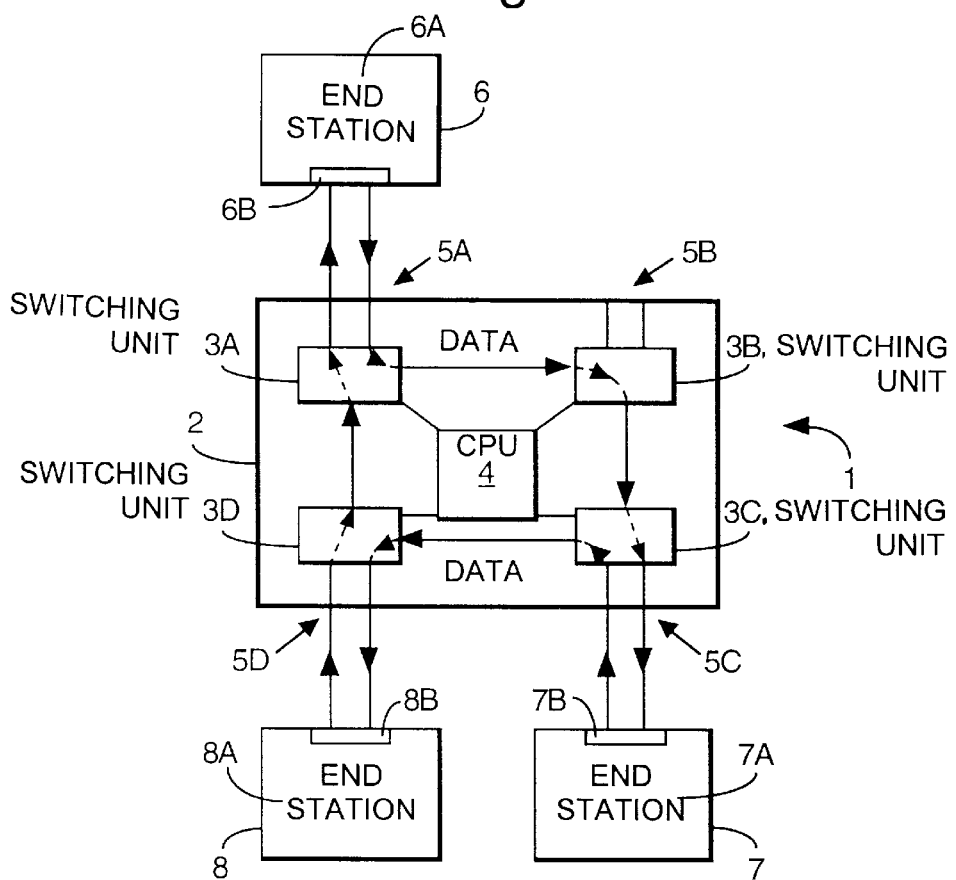
FIG. 1 shows a block diagram of end stations connected to a token ring network.

FIG. 1 illustrates an example of a token ring network 1 having a token ring hub 2 including four switching units 3A–3D connected in a ring, each switching unit being controlled from a central processor 4. Each switching unit 3A–3D can be coupled via a respective port 5A–5D to an end station. In this example, the switching units 3A, 3C and 3D are connected to end stations 6–8 respectively. Each end station 6–8 comprises a host 6A–8A and an adaptor card 6B–8B to interface the host to the token ring.

When the end stations are fully inserted in the ring, the respective switching units 3 are configured to cause data to flow through the switching unit and to the connected end station with returning data being passed on to the next downstream switching unit. The switch conditions of the switching units 3A–3D are shown in FIG. 1 and it will be seen that the switching unit 3B is in a bypass mode since no end station is connected.

The ring may be configured to run at either 4 Mbps or 16 Mbps and the hub 2 is an active hub provided with speed detection circuitry within the processor 4.

Figure 2:
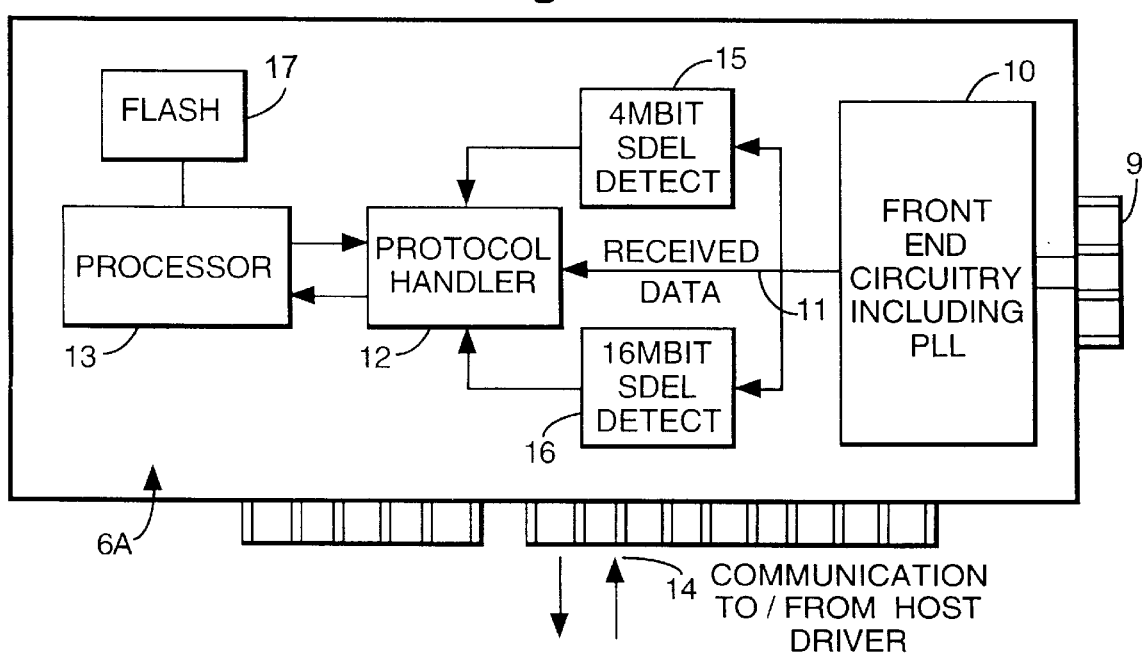
FIG. 2 shows a block diagram of an adaptor card for implementing automatic token ring speed detection in accordance with an example of the present invention; and, FIGS. 3 to 5 show block diagram illustrating token ring speed detection in accordance with an example of the present invention.

FIG. 2 shows a block diagram of the adaptor card 6B. The adaptor card 6B comprises a token ring hub interface 9 which is connected to a front end receive circuit 10 which includes a PLL.

The front end receive circuit 10 passes received data along a patch 11 to a protocol handler 12. The protocol handler 12 is connected to an adaptor card processor 13 which is used to execute the MAC software and speed detect protocol. The adaptor card processor 13 also communicates with a host driver via an end station interface 14.

The adaptor card further comprises a first starting delimiter detector 15 configured to detect starting delimiters in tokens and token ring frames at 4 Mbps and a second starting delimiter detector 16 configured to detect starting delimiters in tokens and token ring frames at 16 Mbps. The starting delimiter detectors include a digital filter and a pattern matcher (not shown). If either of these two detection circuits 15,16 detects starting delimiters at a speed corresponding to 4 Mbps or 16 Mbps, respectively, they signal the adaptor card processor 13 accordingly.

The adaptor card processor 13 is programmed to recognise a number of insertion error codes generated by the MAC software of the adaptor card and act accordingly. This is described in detail below. The speed detection protocol determines the speed that the end station opens into the ring and also the end station idling speed prior to raising phantom. The end station idling speed is the rate at which the protocol handler 12 transmits fill (as defined in the IEEE Standard 802.5). When the adaptor card applies phantom drive, the PLL (not shown) within the front end receives circuit 10 attempts to lock onto the frequency of the ring. During frequency acquisition, the protocol handler 12 idles at a rate set by the speed detection protocol. The adaptor card processor 13 is connected to flash memory 17. The flash memory 17 stores information relating to a successful ring insertion mode for use in a subsequent ring opening procedure.

As discussed above, in the present invention, the MAC software on the adaptor cards 6B–8B can attempt to open into the token ring network 1 using one or more of a number of different insertion modes on the basis of the network implications of different possible insertion failure codes.

In a first mode, termed Auto-16, the adaptor card 6B–8B is configured to run at 16 Mbps with both starting delimiter detectors 15 and 16 active and the protocol handler 12 idling at 16 Mbps. In a second mode, termed Auto-4, the adaptor card 6B–8B is configured to run at 16 Mbps with both starting delimiter detectors 15 and 16 active and with a quarter speed idle function enabled so that the protocol handler 12 idles at 4 Mbps. In a third mode, termed Real-4, the adaptor card 6B–8B is configured to run and idle at 4 Mbps with only the 4 Mbps starting delimiter detector 15 active. In all of the modes, the adaptor card 6B–8B is not permitted to transmit frames until a token ring frame starting delimiter is received from an upstream end station or unless the adaptor card 6B–8B has already determined the speed of the network. This prevents two automatic speed detecting adaptor cards attaching to the ring at the same time from misleading each other as to the correct speed that the network 1 is configured to operate at.

Upon initiation of an end station insertion process, the opening insertion mode is chosen according to the value of the token ring speed stored in the flash memory 17 at the end of the last successful insertion of the adaptor card into the ring. If the adaptor card 6B–8B has not been used previously on the token ring network then it is usually configured to start in the Auto-16 mode.

For each attempt at opening onto the ring there are four general categories of results which are possible:—

1. Dedicated Token Ring registration failure or Lobe Test failure (LT Fail): this can indicate a faulty cable or that no cable is attached, or that the adaptor card is attached to an active re-timing concentrator hub type operating at the other speed. An active re-timing concentrator retimes all data passing through its ports to the ring speed at which they are configured. If the problem is cable-related then the insertion procedure will fail at the other speed as well;

2. No starting delimiters detected during an 18 second period after the adaptor card applies phantom drive (No SDEL): this can indicate that the end station is Single End Station in which case the speed detection operation is designed to fail the insertion procedure, or it means that the adaptor card is connected to an active hub and has been locked out of the main network;

3. SDEL detected at speed X (OK-16 and OK-4): in this case, the speed of the protocol handler 12 and front end hardware 10 of the adaptor card is changed to speed X and the IEEE Standard 802.5 join ring procedure is followed. The ring speed and insertion mode of the adaptor card are then stored in the flash memory 17 to be used when the end station next joins the ring; and 4. Other open failure (ERROR): this indicates a problem on the token ring network which prevents all end stations joining the ring. In this case, the speed of the adaptor card 6B–8B is not an issue, so the error is reported to the host and the insertion procedure fails.

Figure 3:
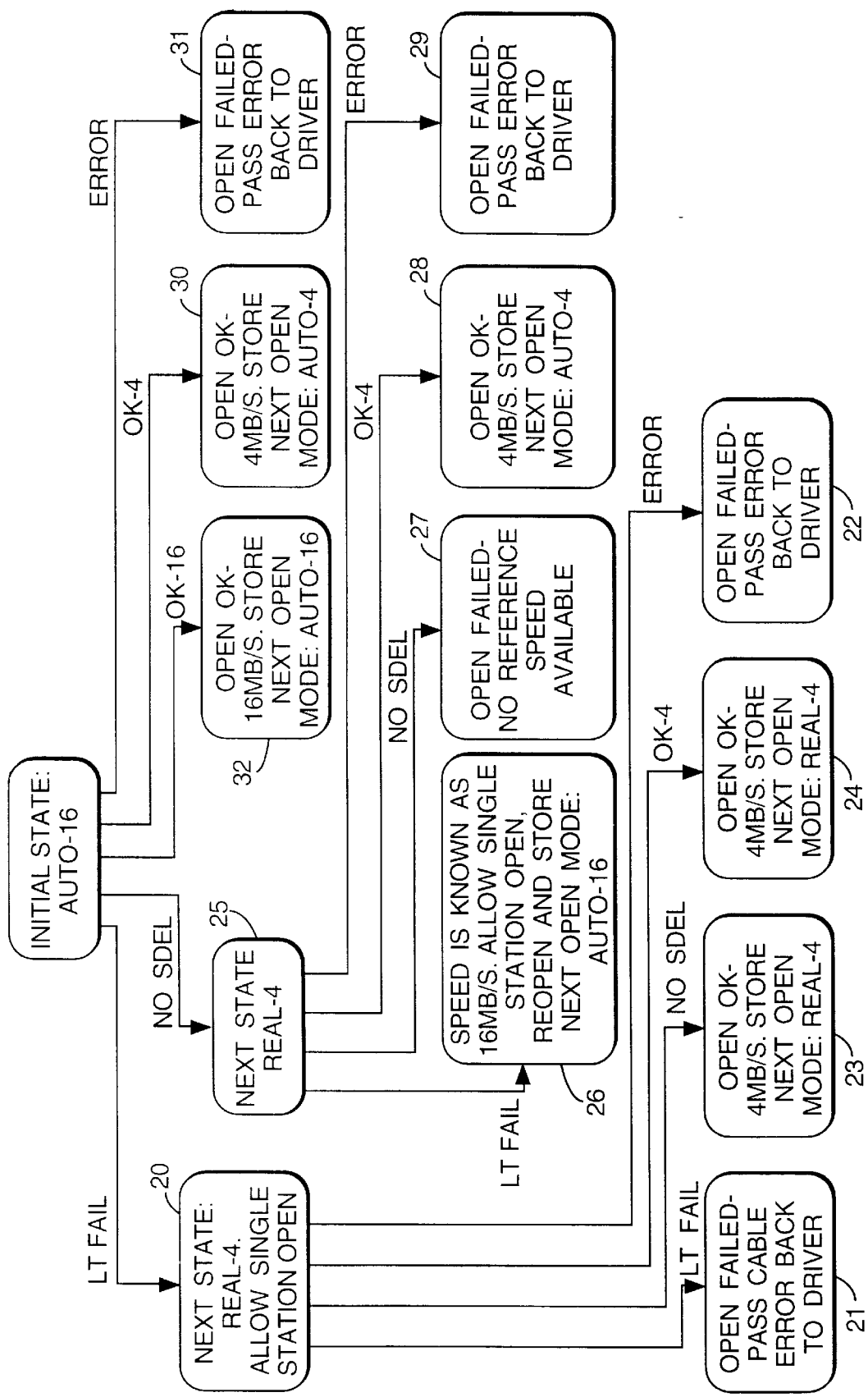
Figure 5:
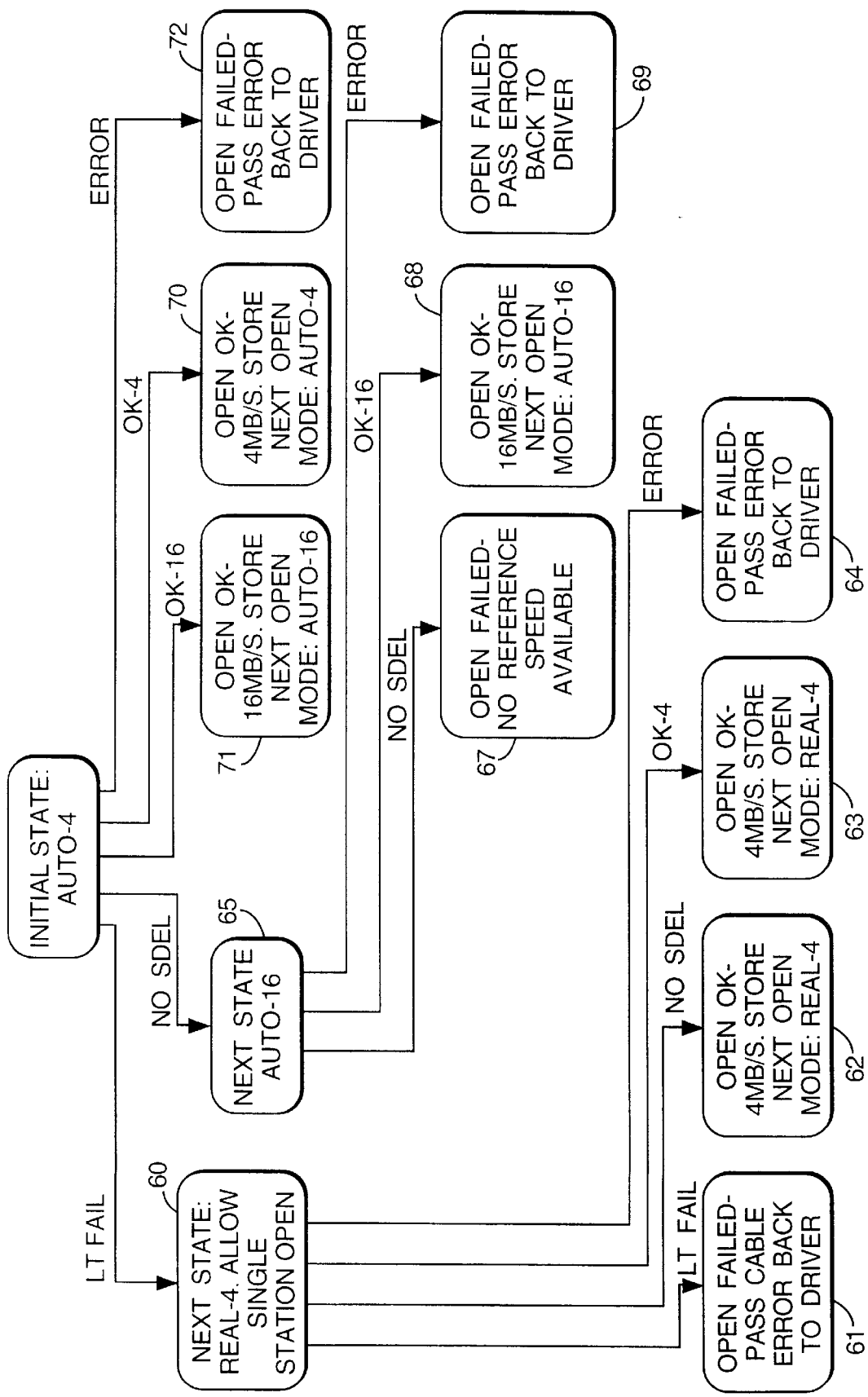

FIGS. 3 and 5 show how the automatic speed detection protocol operates from each of the three possible insertion modes to determine the speed of the token ring network.

In FIG. 3, the opening mode is Auto16. Accordingly, the adaptor card 6B–8B is configured to run at 16 Mbps with both of the starting delimiter detectors 15 and 16 active and the protocol handler 12 idling at 16 Mbps. Lobe tests are initiated by the processor 13 which analyses the resultant lobe test code generated by the protocol handler 12. If, prior to raising phantom, the adaptor card processor 13 receives an indication of LT Fail as a result of the MAC software carrying out a lobe test, the adaptor card 6B–8B is re-configured into the Real-4 mode (step 20). The reason for this is that LT Fail in this mode indicates that the end station is attached to an active re-timing concentrator type hub operating at 4 Mbps and therefore if the speed is switched and the end station is allowed to open Single End Station, it is possible to guarantee to know the speed of the network, if the end station is attached to a network.

In the Real-4 mode an LT Fail indication or ERROR indication means that the opening procedure has failed and the adaptor card 6B–8B therefore passes an error message to the host (steps 21,22). If the lobe test is successful, the adaptor card raises phantom by causing a phantom drive circuit within the front end circuitry 10 to impress a DC signal on the lobe media coupling the end station to the hub 2. If a No SDEL indication or an OK-4 indication is received in the Real-4 mode after successfully raising phantom, then the opening procedure is deemed successful and the opening mode Real-4 is stored in the flash memory 17 (steps 23,24). In the case of a NoSDEL indication, as there has been a LT fail in Auto 16 mode but not in Real 4 mode it is known that the end station is attached to an ARC which will allow the insertion of a single end station (i.e. there are no other end stations transmitting frames).

If the original lobe test is successful, the adaptor card applies phantom drive in the Auto-16 mode. If a No SDEL indication is received, the adaptor card is re-configured in the Real-4 mode (step 25). Subsequently, in the Real-4 mode, a lobe test is performed to determine whether the end station is attached to an ARC. The advantage of knowing this information is that it is possible for a single end station to insert onto the network when connected to an ARC. If an LT Fail indication is received, it is then known that the token ring is running at 16 Mbps. The speed detection protocol allows Single End Station opening at 16 Mbps and Auto-16 is stored in the flash memory 17 (step 26). If the lobe test in Real-4 mode is successful, but a No SDEL indication is then received, the opening procedure is deemed to have failed and no reference speed is available (step 27). If the 4 Mbps starting delimiter detector detects a 4 Mbps data signal then the opening procedure is deemed to have been successful (step 28). Otherwise, if any other ERROR indication is received it is deemed that the opening procedure has failed (step 29). The adaptor card 6B–8B then passes an error message back to the host.

If an SDEL is detected by the detector 16 in Auto-16 mode, this indicates the correct operating speed is 16 Mbps and this value is stored in memory 17 and the end station is successfully inserted (step 32).

If an OK-4 indication is given in the Auto-16 mode (since an SDEL was detected by the detector 15), this means that although the end station has successfully been inserted into the token ring network it is operating at the wrong speed. This is a potential scenario when connecting to a passive token ring hub. As soon as the 4 Mbps starting delimiter detector 15 indicates a 4 Mbps signal, the adaptor card switches its speed to run at 4 Mbps (step 30). This speed change is seamless.

If any other ERROR signal is indicated in the Auto-16 mode then the opening procedure is deemed to have failed and that error message is passed back to the host (step 31).

Figure 4:
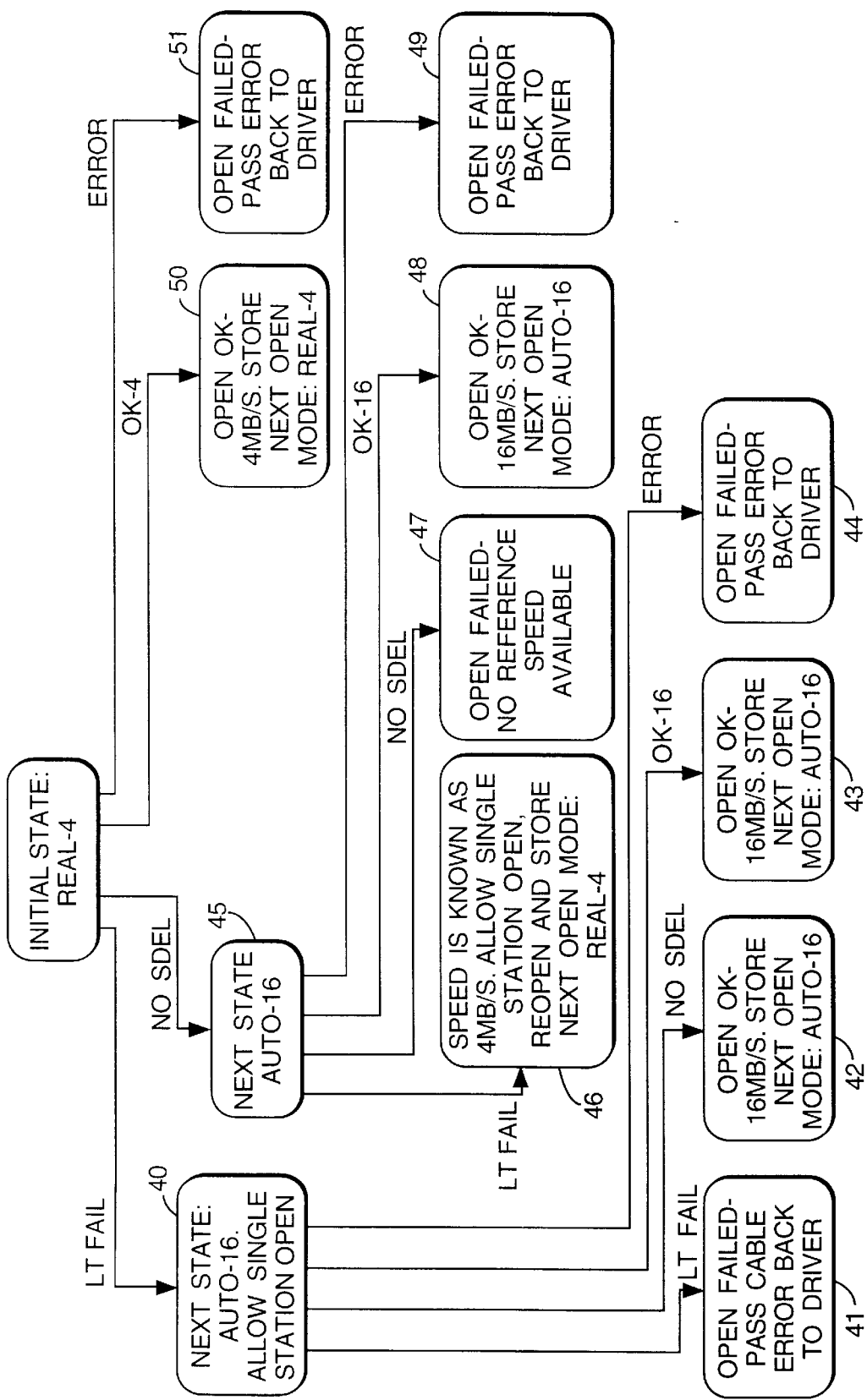

FIG. 4 illustrates how the automatic speed detection protocol operates starting from an initial state of Real-4. As before, the MAC software carrier out a lobe test prior to raising phantom, and if the lobe test fails, the adaptor card 6B–8B is reconfigured into the Auto-16 mode (step 40). A further lobe test is carried out and if this also fails then this indicates a cable failure and an appropriate code is passed back to the host (step 41). If the lobe test succeeds in Auto-16 mode, phantom is raised in the Auto-16 mode and if either a No SDEL indication or an OK-16 indication is received, then the opening procedure is deemed successful and the opening mode Auto-16 is stored in the flash memory 17 (steps 42,43). In the case of a NoSDEL indication, as there has been a LT fail in Auto 16 mode but not in Real 4 mode it is known that the end station is attached to an ARC which will allow the insertion of a single end station (i.e. there are no other end stations transmitting frames). If any other ERROR signal is received after raising phantom, a suitable error code is passed back to the host (step 44).

If the initial lobe test in opening mode Real-4 was successful, phantom is raised. If a No SDEL indication is received, the adaptor card is reconfigured in the Auto-16 mode (step 45). Subsequently, a lobe test is performed to determine whether the end station is attached to an ARC. The advantage of knowing this information is that it is possible for a single end station to insert onto the network when connected to an ARC. If a lobe test fails, the token ring speed is then known as 4 Mbps and a single end station is allowed to open, mode Real-4 being stored in the memory 17 (step 46). If a No SDEL indication is received after a successful lobe test, the opening procedure is deemed to have failed and no reference speed is available (step 47). If the detector 16 detects a SDEL, this indicates that the opening procedure has been successful and Auto-16 is stored in the memory 17 (step 48). Finally, if any other ERROR indication is received, it is deemed that the opening procedure has failed (step 49). The adaptor card 6B–8B then passes an error message back to the host.

If a SDEL is detected in the Real-4 mode by the detector 15, this indicates that the opening procedure has been successful in that mode and Real-4 is stored in the memory 17 (step 50). Otherwise, any other ERROR signal indicates opening failure and a suitable error code is passed back to the host (step 51).

In the third mode, indicated in FIG. 5, the adaptor card 6B–8B is initially configured to run in the Auto-4 mode at 4 Mbps. Initially, a lobe test is carried out and if this fails, the adapter card 6B–8B is reconfigured into the Real-4 mode (step 60). A further lobe test is carried out and if this also fails then this indicates a cable failure and an appropriate code is passed back to the host (step 61). If the lobe test succeeds in Real-4 mode, phantom is raised in the Real-4 mode and if either a No SDEL indication or an OK-4 indication is received, then the opening procedure is deemed successful and the opening mode Real-4 is stored in the flash memory 17 (steps 62,63). If any other ERROR signal is received after raising phantom, a suitable error code is passed back to the host (step 64).

If the initial lobe test in opening mode Auto-4 was successful, phantom is raised. If a No SDEL indication is received, the adaptor card is reconfigured in the Auto-16 mode (step 65). Subsequently, if a No SDEL indication is received, the opening procedure is deemed to have failed and no reference speed is available (step 67). If the detector 16 detects a SDEL, this indicates that the opening procedure has been successful and Auto-16 is stored in the memory 17 (step 68). Finally, if any other ERROR indication is received, it is deemed that the opening procedure has failed (step 69). The adapter card 6B–8B then passes an error message back to the host.

If a SDEL is detected in the Auto-4 mode by the detector 15, this indicates that the opening procedure has been successful in that mode and Auto-4 is stored in the memory 17 (step 70). Alternatively, if the detector 15 detects an SDEL, this indicates that the correct mode is Auto-16 and this is stored in the memory 17 (step 71). Otherwise any other ERROR signal indicates opening failure and a suitable error code is passed back to the host (step 72).

As illustrated, the speed detection protocol within the adaptor card 6B–8B of the present invention makes use of information provided by the MAC software in terms of initial failure indications signalled during the opening procedure to determine the next opening mode. By providing three ring insertion modes, the speed detection protocol ensures successful entry into a far wider range of token ring hubs 2, regardless of the speed of operation of the token ring network. The speed detection protocol uses the fact that Lobe Test failure or DTR registration failure at one speed guarantees that the network is operating at the other speed or that there is no network attached. This means that the end station can safely attach Single End Station to such a network and guarantee that the speed is correct.

During automatic speed insertion, an end station is not permitted to transmit frames until it has received an SDEL from an upstream end station. This prevents two speed detecting end stations from joining the ring at the same time from misleading one another. In addition, this ensures minimal disruption to the token ring network and that a speed detecting end station that has not determined the correct speed of the network cannot be the first and station to enter the ring.

The hardware implemented quarter speed idle function allows seamless entry into 4 Mbps configured hub types whilst the end station hardware is configured to run at 16 Mbps. This allows the end station to oversample the data on the network. Should the configuration then be changed at the hub, seamless migration to 16 Mbps can occur.

I claim:

1. A method for insertion of an end station into a token ring network, said method comprising:

said end station attempting to open into said ring network in one insertion mode; and said end station responding to an insertion error code relating to an insertion event, before said end station applies phantom drive, to change from the one insertion mode to another insertion mode, wherein a change of insertion mode is a change in at least one of end station speed and end station idling speed.

2. A method according to claim 1, wherein said insertion error code is a lobe test failure code.

3. A method according to claim 1, wherein at least three insertion modes are provided.

4. A method according to claim 3, wherein in a first insertion mode, said end station is configured to run at a first speed and idle at the same speed; in a second insertion mode said end station is configured to run at the first speed and idle at a second speed; and, in a third insertion mode said end station is configured to run at the second speed and idle at the second speed.

5. A method according to claim 4, wherein said first speed is 16 Mbps and said second speed is 4 Mbps.

6. A method of inserting an end station into a token ring network, said method comprising:

said end station attempting to open into said ring network in one insertion mode; and said end station responding to an insertion error code relating to an insertion event, before said end station applies phantom drive, to change from the one insertion mode to another insertion mode, wherein a change of insertion mode is a change in at least one of end station speed and end station idling speed, and wherein said end station remains passive after applying phantom drive and does not transmit token ring frames until starting delimiters in token ring frames from an upstream end station in said token ring are detected.

7. A method of inserting an end station into a token ring network, said method comprising:

said end station attempting to open into said ring network in one insertion mode; and said end station responding to an insertion error code relating to an insertion event, before said end station applies phantom drive, to change from the one insertion mode to another insertion mode, wherein a change of insertion mode is a change in at least one of end station speed and end station idling speed, wherein said end station remains passive after applying phantom drive and does not transmit token ring frames until starting delimiters in token ring from an upstream end station in said token ring are detected, and wherein a change from one insertion mode to another results in a successful end station lobe test, the phantom drive is applied and the end station transmits token ring frames.

8. Apparatus for performing speed detection of a token ring network when an end station attempts to open into the ring, the apparatus comprising a processor for detecting insertion error codes relating to insertion failure events before said end station applies phantom drive and for affecting a change from one insertion mode to another insertion mode, where a change in insertion mode is a change in at least one of end station speed and end station idling speed, and thereby configure the end station to run at the same speed as the token ring network.

9. Apparatus according to claim 8, further comprising a data sampler for sampling a data signal on the ring after the end station has applied phantom drive to detect the speed of the data signal.

10. Apparatus according to claim 19, wherein said data sampler comprises a phase lock loop, a first token ring frame starting delimiter detector configured to detect starting delimiters at a first speed and a second token ring frame starting delimiter detector configured to detect starting delimiters at a second speed.

11. Apparatus according to claim 8, wherein said processor is programmed so that in the event that the speed of the network is not determined before the end station applies phantom drive, said processor prevents said end station from transmitting token ring frames of its own until the data sampling means detects starting delimiters in tokens or token ring frames from an upstream end station.

12. Apparatus according to claim 8, wherein said processor is programmed to operate in at least three insertion modes, whereby in a first insertion mode, said end station is configured to run at a first speed and idle at the same speed; in a second insertion mode said end station is configured to run at the first speed and idle at a second speed; and, in a third insertion mode said end station is configured to run at the second speed and idle at the second speed.

13. Apparatus according to claim 8, wherein said processor is provided in an adaptor card.

* * * * *